United States Patent [19]

Fox, Jr.

[11] Patent Number: 5,758,891
[45] Date of Patent: Jun. 2, 1998

[54] SPRING STEP FOR THE REAR OF VEHICLES

[76] Inventor: Norman Wilson Fox, Jr., 10732 Wolfsville Rd., Myersville, Md. 21773

[21] Appl. No.: 839,954

[22] Filed: Apr. 27, 1997

[51] Int. Cl.⁶ .................................................. B60R 3/00
[52] U.S. Cl. ............................ 280/163; 280/166; 182/90; 293/118
[58] Field of Search ........................... 280/163, 164.1, 280/166; 182/90, 91, 92; 293/118, 119, 117

[56] References Cited

U.S. PATENT DOCUMENTS

| | | | |
|---|---|---|---|
| 317,722 | 5/1885 | Campbell et al. | 280/163 |
| T977,005 | 12/1978 | Sidles, Jr. et al. | 280/163 |
| 5,139,295 | 8/1992 | Escobedo | 280/163 |

*Primary Examiner*—Richard M. Camby

[57] ABSTRACT

A new spring step for the rear ends of vehicles for facilitating access to the back ends of high vehicles, such as trucks and utility vehicles. The spring step includes a step member having a horizontal upper surface. A pair of semi-rigid members, preferably coil springs, are attached to the step member and extend vertically upward from the upper surface. The ends of the semi-rigid members are removably attached to a channel member which is used to secure the step member and semi-rigid members to a support structure, such as a rear bumper, of the vehicle. The semi-rigid members are stiff enough to permit an individual to stand on the step member without significant deflection of the semi-rigid members, so that the step functions similarly to conventional steps on the rear ends of vehicles. However, if the step encounters an obstacle or obstruction while the vehicle is backing up, the semi-rigid members resiliently flex so that the step member deflects. Thus, little or no damage is done to the step. Upon removal of the obstacle or obstruction, the semi-rigid members return the step member to its original position.

6 Claims, 2 Drawing Sheets

SPRING STEP FOR THE REAR OF VEHICLES

BACKGROUND OF THE INVENTION

1. Field of the Invention

The present invention relates to steps for vehicles, particularly high vehicles such as trucks, and more particularly pertains to a new spring step for providing access to the back end of higher vehicles, such as trucks and utility vehicles.

2. Description of the Prior Art

The use of steps on vehicles is known in the prior art. More specifically, steps for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art steps include U.S. Pat. No. 4,180,143; U.S. Pat. No. 324,019; U.S. Pat. No. 4,605,098; U.S. Pat. 5,312,150; U.S. Pat. No. 4,753,447 and U.S. Pat. No. 4,462,486.

While these devices fulfill their respective, particular objectives and requirements, the aforementioned patents do not disclose a new spring step for the rear of vehicles. The inventive device includes a step member having a horizontal upper surface. A pair of semi-rigid members, preferably coil springs, are attached to the step member and extend vertically upward from the upper surface. The ends of the semi-rigid members are removably attached to a channel member which is used to secure the step member and semi-rigid members to a support structure, such as a rear bumper, of the vehicle. The semi-rigid members are stiff enough to permit an individual to stand on the step member without significant deflection of the semi-rigid members, so that the step functions similarly to conventional steps on the rear ends of vehicles. However, if the step encounters an obstacle or obstruction while the vehicle is backing up, the semi-rigid members resiliently flex so that the step member deflects. Thus, little or no damage is done to the step. Upon removal of the obstacle or obstruction, the semi-rigid members return the step member to its original position.

In these respects, the spring step for the rear of vehicles according to the present invention substantially departs from the conventional concepts and designs of the prior art, and in so doing provides an apparatus primarily developed for the purpose of providing access to the back ends of higher vehicles, such as trucks and utility vehicles.

SUMMARY OF THE INVENTION

In view of the foregoing disadvantages inherent in the known types of vehicle steps now present in the prior art, the present invention provides a new spring step for the rear ends of vehicles wherein the same can be utilized for providing access to the back ends of high vehicles, such as trucks and utility vehicles.

The general purpose of the present invention, which will be described subsequently in greater detail, is to provide a new spring step for the rear ends of vehicles apparatus which has many of the advantages of the vehicle steps mentioned heretofore and many novel features that result in a new spring step for the rear ends of vehicles which is not anticipated, rendered obvious, suggested, or even implied by any of the prior art vehicle steps, either alone or in any combination thereof.

To attain this, the present invention generally comprises a step member having a horizontal upper surface. A pair of semi-rigid members, preferably coil springs, are attached to the step member and extend vertically upward from the upper surface. The ends of the semi-rigid members are removably attached to a channel member which is used to secure the step member and semi-rigid members to a support structure, such as a rear bumper, of the vehicle. The semi-rigid members are stiff enough to permit an individual to stand on the step member without significant deflection of the semi-rigid members, so that the step functions similarly to conventional steps on the rear ends of vehicles. However, if the step encounters an obstacle or obstruction while the vehicle is backing up, the semi-rigid members resiliently flex so that the step member deflects. Thus, little or no damage is done to the step. Upon removal of the obstacle or obstruction, the semi-rigid members return the step member to its original position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spring step for the rear ends of vehicles which has many of the advantages of the steps for vehicles mentioned heretofore and many novel features that result in a new spring step for the rear ends of vehicles which is not anticipated, rendered obvious, suggested, or even implied by any of the prior art steps for vehicles, either alone or in any combination thereof.

It is another object of the present invention to provide a new spring step for the rear ends of vehicles which may be easily and efficiently manufactured and marketed.

It is a further object of the present invention to provide a new spring step for the rear ends of vehicles which is of a durable and reliable construction.

An even further object of the present invention is to provide a new spring step for the rear ends of vehicles which is susceptible of a low cost of manufacture with regard to both materials and labor, and which accordingly is then susceptible of low prices of sale to the consuming public, thereby making such spring step for the rear ends of vehicles economically available to the buying public.

Still yet another object of the present invention is to provide a new spring step for the rear ends of vehicles which provides in the apparatuses and methods of the prior art some of the advantages thereof, while simultaneously overcoming some of the disadvantages normally associated therewith.

Still another object of the present invention is to provide a new spring step for the rear ends of vehicles for providing access to the back of higher vehicles, such as trucks and utility vehicles.

Yet another object of the present invention is to provide a new spring step for the rear ends of vehicles which includes a step member having a horizontal upper surface. A pair of semi-rigid members, preferably coil springs, are attached to the step member and extend vertically upward from the upper surface. The ends of the semi-rigid members are removably attached to a channel member which is used to secure the step member and semi-rigid members to a support structure, such as a rear bumper, of the vehicle. The semi-rigid members are stiff enough to permit an individual to stand on the step member without significant deflection of the semi-rigid members, so that the step functions similarly to conventional steps on the rear ends of vehicles. However, if the step encounters an obstacle or obstruction while the vehicle is backing up, the semi-rigid members resiliently flex so that the step member deflects. Thus, little or no damage is done to the step. Upon removal of the obstacle or obstruction, the semi-rigid members return the step member to its original position.

Still yet another object of the present invention is to provide a new spring step for the rear ends of vehicles that attaches easily to the rear of high vehicles.

Even still another object of the present invention is to provide a new spring step for the rear ends of vehicles that prevents damage to the step when the vehicle is inadvertently reversed into a stationary object.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
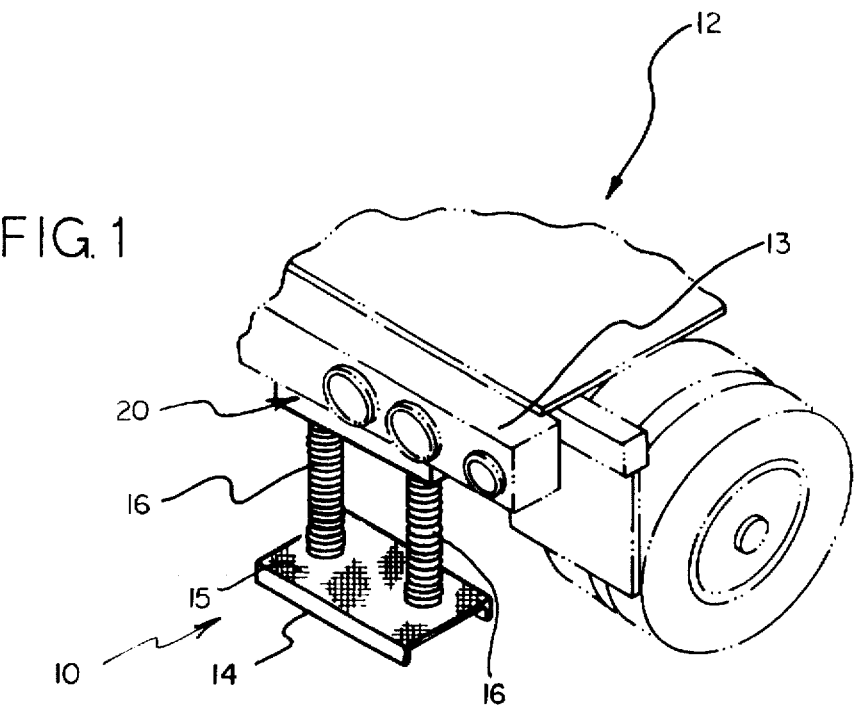
FIG. 1 is an elevated right side perspective view of a new spring step attached to a rear end of a vehicle according to the present invention.
Figure 2:
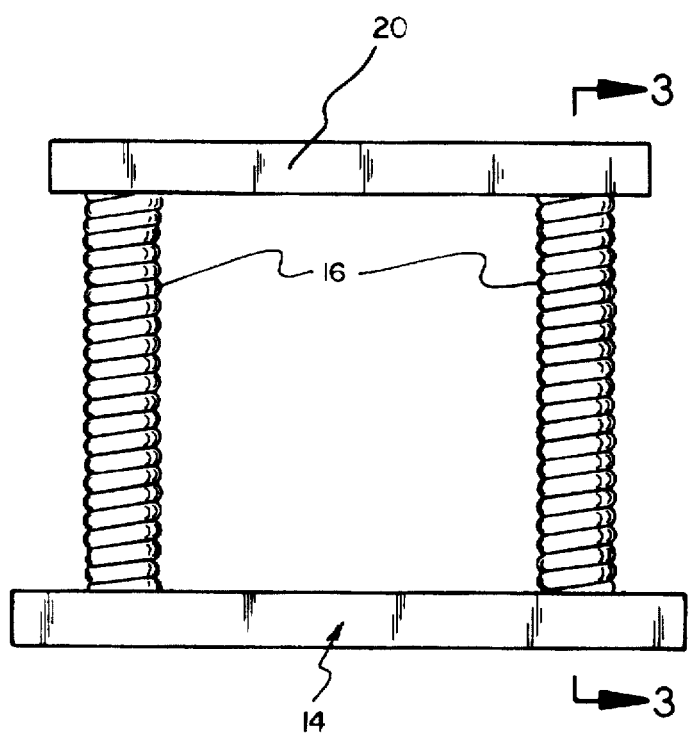
FIG. 2 is a front view of the present invention.
Figure 3:
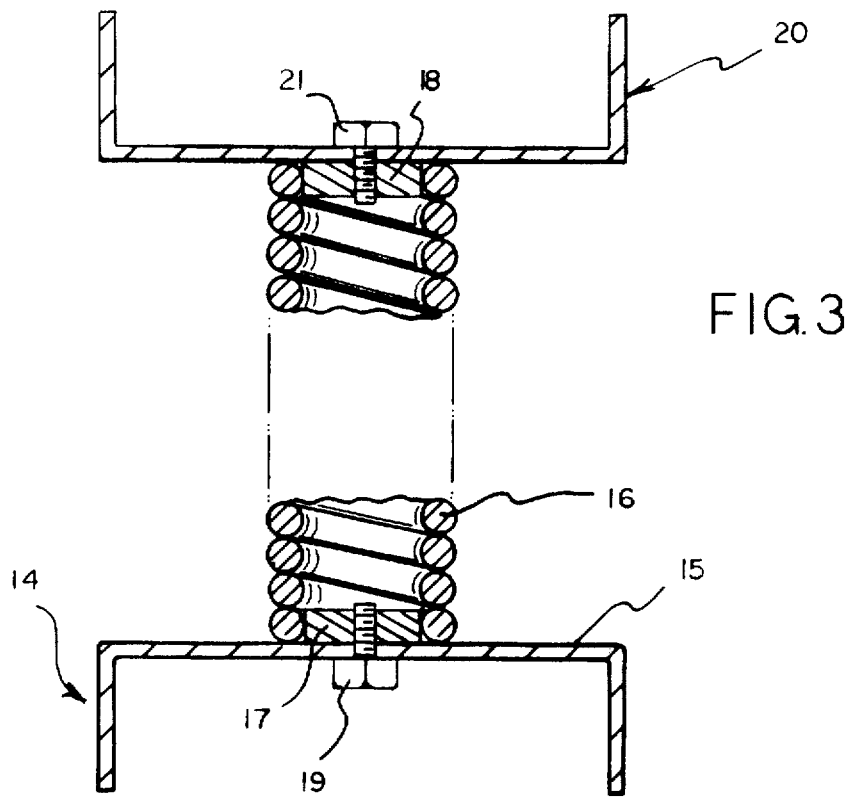
FIG. 3 is a cross sectional view taken along line 3—3 of FIG.

With reference now to the drawings, and in particular to FIGS. 1 through 3 thereof, a new spring step for the rear ends of vehicles embodying the principles and concepts of the present invention and generally designated by the reference numeral 10 will be described.

Figure 4:
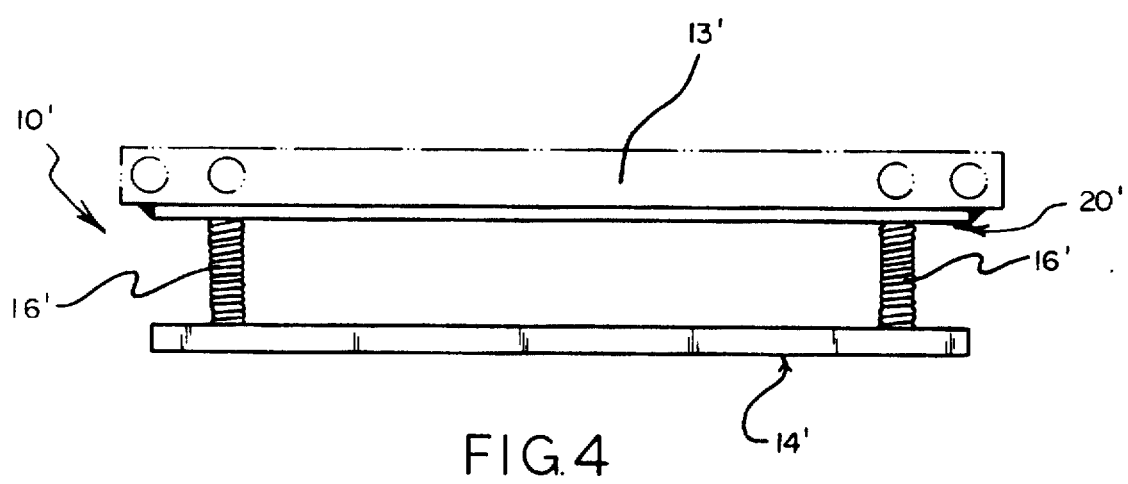
FIG. 4 is a rear view of an alternate embodiment.

More specifically, and referring first to FIG. 1, it is seen that the spring step 10 is secured to the rear end of a vehicle 12, such as a truck or utility vehicle. In particular, the spring step 10 is secured to a bumper 13 located at the very back end of the vehicle 12. The spring step is secured such that it extends downward from the bumper 13, thus forming a step for an individual to step on in order to climb onto the rear of the vehicle. As shown, the spring step 10 is located on the right end of the bumper 13 for accessing the right rear end of the vehicle. An identical spring step is also located on the left end of the bumper, and/or at the center of the bumper, for accessing different areas of the rear end. Or else, as shown in FIG. 4, the spring step 10' can comprise a single member which extends over the entire bumper 13.

Steps extending down from rear ends of vehicles to aid in accessing the rear ends are generally known in the art. These steps are usually rigidly mounted. Frequently, when the vehicle is backing up, the steps encounter obstacles or obstructions. Since the steps are rigidly mounted, they are usually bent, deformed, or otherwise permanently damaged upon encountering these obstacles and obstructions. The spring step 10,10' disclosed herein is meant to prevent damage thereto when obstacles are encountered.

Turning to FIGS. 1–3, it is seen that the spring step 10 includes a step member 14 which is generally rectangular in shape and made from a C-shaped section of channel material, as best seen in FIG. 3. The material of the step member is preferably metal, although other high strength materials can be used as well. The open side of C-shaped channel faces downward, thus forming a generally horizontal upper stepping surface 15. The surface 15 is suitably roughened to form a non-skid surface, thus preventing slipping while standing or stepping on the surface 15.

The step member 14 should be sized so as to permit a user's foot or feet to stand or step thereon. For instance, the step member could be about 12 inches long, and about 4 to 6 inches wide, although other sizes could be used if desired.

A pair of semi-rigid coil springs 16 are attached to the step member 14 adjacent either end thereof so as to extend vertically upward from the upper surface 15. The springs 16 can be about 18–24 inches long, with a diameter of about 3 inches. The wire forming each coil preferably has a diameter of about ½ to ⅝ inches. The term semi-rigid, as used herein, means a spring which stretches or elongates only nominally when a user steps or stands on the step member, but which resiliently deflects upon a sufficiently large force being applied to the step member, such as when the step member encounters an obstacle. The springs are preferably designed such that they flex or deflect at a level of force applied thereto which is below a level of force which would cause significant damage to the step member, such that the step member and springs deflect before significant damage is done to the step member. Thus, the actual dimensions of the coil springs should be selected such that the springs are semi-rigid.

Inserts 17,18 are securely retained inside each spring 16, such as by welding, adjacent each end of the springs 16. The inserts are solid, circular metallic members which facilitate attachment of each end of the springs. A threaded fastener 19, such as a screw or bolt, extends through an aperture in the horizontal portion of the step member 14 and into a threaded hole provided in the insert 17, for securing the step member to one end of the springs.

The opposite ends of the springs are attached to an attachment means 20. The attachment means 20 comprises a C-shaped section of channel material, of approximately similar shape, size, and material as the step member 14, but whose open side faces upward. A threaded fastener 21, such as a screw or bolt, extends through an aperture in the horizontal portion horizontal portion of the attachment means 20 and into a threaded hole provided in the insert 18, for securing the attachment means to the opposite, distal end of the springs. The attachment means 20 itself is affixed to the bumper 13 in any appropriate manner, such as by welding or mechanical fasteners, so to mount the spring step 10 in place.

In the alternate embodiment illustrated in FIG. 4, elements similar to those shown in FIGS. 1–3 are referenced by the same numerals, but with a prime designation. Thus it is seen that the semirigid springs 16' are attached between an elongated step member 14' and an elongated attachment means 20', such that the spring step 10' is disposed over substantially the entire rear end of the vehicle.

In use, after attaching the step member and the attachment means to the springs using the fasteners 19,21, the attachment means is secured to the bumper 13 such that it extends down from the bottom of the bumper. To climb onto the rear of the vehicle, or otherwise access the rear of the vehicle, the user simply steps onto, or stands on, the step member 14. Since the springs generally stiff, or semi-rigid, the springs will only nominally stretch due to the weight of the individual upon the step member, so that the spring step functions similarly to conventional steps. However, if the step member contacts an obstruction with a sufficient force while the truck is backing up, the springs will deflect or flex, so that the step member yields to such potential damaging force without significant damage being inflicted upon the step member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A step for a rear end of a vehicle comprising: a step member having a generally horizontal upper surface;

a semi-rigid member fastened at one end thereof to said step member and extending upward from said upper surface;

said semi-rigid member having a distal end spaced from said upper surface;

means for attaching said distal end to a support structure at the rear end of the vehicles;

said semi-rigid member comprises a coil spring;

an insert is secured within said coil spring at said distal end thereof;

said means for attaching comprises a C-shaped channel member secured to said distal end; and a fastener extends through said C-shaped channel member and into said insert for securing said channel member to said distal end of said spring.

2. The step according to claim 1, further comprising an additional coil spring fastened to said step member and extending upward from said upper surface thereof, said additional coil spring having a distal end spaced from said upper surface and attached to the support structure by said means for attaching.

3. The step according to claim 2, wherein said coil springs are spaced apart from each other.

4. A step for a rear end of a vehicle comprising:

a step member having a generally horizontal upper surface;

a semi-rigid member fastened at one end thereof to said step member and extending upward from said upper surface;

said semi-rigid member having a distal end spaced from said upper surface;

means for attaching said distal end to a support structure at the rear end of the vehicle;

said semi-rigid member comprises a coil spring;

said means for attaching comprises a C-shaped channel member secured to said distal end;

an insert is secured within said coil spring at said distal end thereof;

a fastener extends through said C-shaped channel member and into said insert for securing said channel member to said distal end of said spring;

an additional coil spring fastened to said step member and extending upward from said upper surface thereof;

said additional coil spring having a distal end spaced from said upper surface and attached to the support structure by said means for attaching; and said coil springs extending substantially vertically from said upper surface.

5. The step according to claim 4, wherein said step member further comprises:

another C-shaped channel member;

another insert secured within said coil spring at said one end thereof; and another fastener extends through said other channel member and into said other insert for securing said step member to said one end of said spring.

6. The step according to claim 5, wherein each said fastener is threaded such that the respective said channel member is removably attached to said spring.

\* \* \* \* \*